United States Patent
Black et al.

(10) Patent No.: US 9,823,137 B1
(45) Date of Patent: Nov. 21, 2017

(54) FIBER OPTIC TEMPERATURE SENSOR INSERT FOR HIGH TEMPERATURE ENVIRONMENTS

(71) Applicants: Richard James Black, Menlo Park, CA (US); Joannes M. Costa, Rancho La Costa, CA (US); Behzad Moslehi, Los Altos, CA (US); Livia Zarnescu, Menlo Park, CA (US)

(72) Inventors: Richard James Black, Menlo Park, CA (US); Joannes M. Costa, Rancho La Costa, CA (US); Behzad Moslehi, Los Altos, CA (US); Livia Zarnescu, Menlo Park, CA (US)

(73) Assignee: Intelligent Fiber Optic Systems, Inc., Santa Clara, CA (US)

( * ) Notice: Subject to any disclaimer, the term of this patent is extended or adjusted under 35 U.S.C. 154(b) by 691 days.

(21) Appl. No.: 14/093,461

(22) Filed: Nov. 30, 2013

(51) Int. Cl.
*G01K 11/00* (2006.01)
*G01J 5/00* (2006.01)
*G01K 1/00* (2006.01)
*G01K 3/00* (2006.01)
*G01K 11/32* (2006.01)

(52) U.S. Cl.
CPC ..................................... *G01K 11/32* (2013.01)

(58) Field of Classification Search
USPC ................ 374/141, 124, 131, 137, 161, 208
See application file for complete search history.

(56) References Cited

U.S. PATENT DOCUMENTS

| | | | | |
|---|---|---|---|---|
| 2006/0251147 A1* | 11/2006 | Balan | ................. | G01K 11/3213 374/152 |
| 2009/0202194 A1* | 8/2009 | Bosselmann | ...... | G01K 11/3206 385/12 |
| 2012/0265184 A1* | 10/2012 | Sliwa | ................... | A61B 5/0084 606/15 |
| 2013/0193961 A1* | 8/2013 | Wen | ...................... | G01J 1/0407 324/244.1 |
| 2014/0318273 A1* | 10/2014 | Dong | ................. | G01K 11/3206 73/862.624 |
| 2014/0336637 A1* | 11/2014 | Agrawal | ............ | A61B 18/1492 606/41 |
| 2015/0342463 A1* | 12/2015 | Garibotto | ............. | A61B 5/0059 600/474 |

* cited by examiner

*Primary Examiner* — Mirellys Jagan
(74) *Attorney, Agent, or Firm* — File-EE-Patents.com; Jay A. Chesavage

(57) ABSTRACT

A thermal protection system (TPS) test plug has optical fibers with FBGs embedded in the optical fiber arranged in a helix, an axial fiber, and a combination of the two. Optionally, one of the optical fibers is a sapphire FBG for measurement of the highest temperatures in the TPS plug. The test plug may include an ablating surface and a non-ablating surface, with an engagement surface with threads formed, the threads having a groove for placement of the optical fiber. The test plug may also include an optical connector positioned at the non-ablating surface for protection of the optical fiber during insertion and removal.

20 Claims, 6 Drawing Sheets

Hybrid System cross section detail of TPS plug with fiber groove variants

Detail A1

Detail A2

Detail A3

FBG sensor pairs

FIBER OPTIC TEMPERATURE SENSOR INSERT FOR HIGH TEMPERATURE ENVIRONMENTS The present invention was developed under the United States National Aeronautics and Space Administration (NASA) grant NNX11CI02P. The government has certain rights in this invention.

FIELD OF THE INVENTION

The present invention relates to a measurement system and method for making high temperature measurements using a plug which incorporates a sensor, with the plug fabricated from the same material and having a complimentary form as the material surrounding the plug.

BACKGROUND OF THE INVENTION

A Thermal Protection System (TPS) is used to provide heat shielding for the payload and structure of aerospace vehicles traveling at hypersonic speeds in atmospheric environments such as during launch or reentry into the earth's atmosphere or entry into the Martian atmosphere. There are two principal TPS types: reusable (as used for the Shuttle) and ablative (as used for planetary entry probes). For a reusable TPS, typically used for mild entry environments, the mass and properties of the TPS are not changed. On the other hand, an ablative TPS protects the vehicle using a thermo-chemical process, such as an ablation process that lifts the hot shock gas layer away from the vehicle, heat absorption which protects the vehicle through ablation of the TPS material, and creation of a char layer which is both an effective insulator and an effective radiant heat shield from the shock layer.

Lightweight ablation materials include phenolic impregnated carbon ablator (PICA), as developed by NASA Ames and used in the Stardust Sample return mission, PICA-X developed by SpaceX for the Dragon space capsule, Silicone Impregnated Reusable Ceramic Ablator (SIRCA) developed by NASA Ames and used on the back shell of the Mars Pathfinder, Superlight Ablator (SLA) particularly SLA-561, a proprietary ablative material made by Lockheed Martin that is the primary TPS material on the 70 degree sphere-cone entry vehicles sent to Mars by NASA, and Avcoat manufactured by HR Textron. Each of these materials requires characterization during testing, and for various reasons is challenging to characterize for temperature profile. Prior art measurement systems typically use thermocouples for this purpose, with one thermocouple used for each measurement. A disadvantage of this approach is that each discrete thermocouple requires its own aperture and penetration into the material, and a large number of measurements results in a large number of thermocouple ingresses and egresses. The thermocouple wire itself is formed from metallic wire, and therefore has a significantly different thermal conductivity than the TPS material which surrounds it. Accordingly, the large number of ingresses and egresses of conductive wire each represent a discontinuity in the insulating material, thereby contributing to measurement inaccuracy. It is desired to provide a single string-like sensor with a plurality of sensors fabricated along the string, thereby providing a large number of temperature measurements with a minimum number of ingresses and egress.

OBJECTS OF THE INVENTION

A first object of the invention is a thermal profile system having a test plug with a first sensor formed using a first linear array of fiber Bragg gratings (FBG), and a second linear array of FBGs, the first linear array substantially parallel to a first surface of the test plug exposed to a high temperature, and the second linear array positioned at an angle to the first linear array and in the same plane as the first linear array, the plane optionally being substantially perpendicular to the first surface of the test plug or parallel to the central axis of the test plug.

A second object of the invention is a thermal profile system having a test plug with a helically wound optical fiber having a plurality of FBGs fabricated along the length of the optical fiber.

A third object of the invention is a thermal profile system having a test plug with a helically wound optical fiber, the optical fiber having a plurality of FBGs fabricated along the length of the optical fiber and where each FBGs is positioned a substantially uniform axial separation distance from a preceding or successive FBG.

A fourth object of the invention is a thermal profile system having a test plug with a helically wound optical fiber, the optical fiber having a plurality of FBGs fabricated along the length of the optical fiber and where each FBG is positioned a substantially uniform circumferential separation distance from a preceding or successive FBG.

SUMMARY OF THE INVENTION

A test plug, also known as an insert, is formed with a complementary shape to a form made from similar material and which receives the test plug. A string sensor is formed from a plurality of sensors such as fiber Bragg gratings (FBG) which have a reflected optical wavelength which varies according to an temperature sensed by the grating, and which are formed in discrete positions along the fiber and are positioned along the length of the optical fiber. Each particular sensor reflects optical energy in a unique range of wavelengths, and each sensor in the sequence which receives optical energy outside its unique range of wavelengths from another sensor passes this reflected optical energy along. In this manner, one end of the string of sensors may be excited by the broadband source, and also receive narrowband optical reflections from each sensor in the string sensor, thereby simultaneously providing temperature measurements (in the form of wavelength shifts) from each sensor. In one embodiment of the invention, sensors are positioned linearly and parallel to the central axis of the test plug. In another embodiment of the invention, a first string sensor and a second string sensor are positioned in a common plane, with the first string sensor positioned at an angle with respect to the second string sensor, and the second string sensor positioned parallel to an ablation surface of the test plug.

In another example of the invention, a string sensor is wound helically about the outer diameter of a test plug, where the string sensor has a plurality of FBG sensors located circumferentially with a separation distance which results in the sensors being separated by a substantially uniform distance along a line substantially perpendicular to one surface of the test plug.

In another example of the invention, a first string sensor is wound helically about the outer diameter of a test plug, and a second string sensor is positioned linearly either parallel or at an angle with respect to the central axis of the test plug.

In another example of the invention, a string sensor having a plurality of FBGs is positioned in a groove at the inner extent of a helical thread cut into a test plug, and the test plug is formed from at least one of phenolic impregnated carbon ablator (PICA) or Silicone Impregnated Reusable Ceramic Ablator (SIRCA).

BRIEF DESCRIPTION OF THE DRAWINGS

FIG. 8D-1 is another embodiment of a detail view of FIG. 8B.

DETAILED DESCRIPTION OF THE INVENTION

Figure 1:
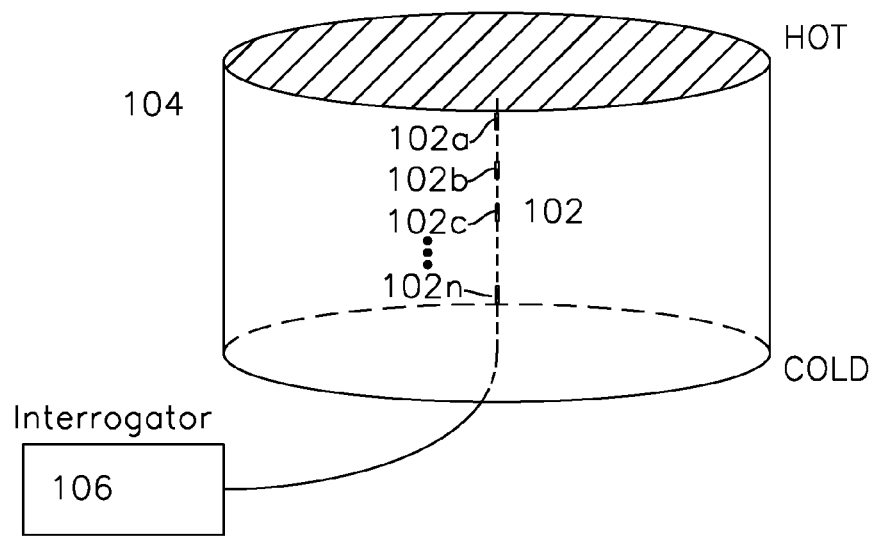
FIG. 1 is a perspective view of a test plug having an axially oriented sensor.

The present invention provides for the bulk attachment of an optical fiber having a plurality of sequential gratings formed in the optical fiber to perform temperature measurements in a series of localized regions which are separated by a uniform or non-uniform distance from an ablating surface of the test plug. The present invention uses FBGs which are disposed along the optical fiber to form a sensor string, with each FBG responsive in a range of wavelengths which is exclusive from any other FBG on the string sensor. In this manner, when a broadband optical source is coupled to one end of the optical fiber through an optical circulator, the reflected optical energy will return to the optical circulator for direction to a wavelength discriminator, with each returned wavelength corresponding to the temperature of a corresponding FBG sensor.

There are many advantages of using optical fiber for this type of high temperature measurement. One advantage is that the optical fiber has a thermal conductivity which is much closer to the thermal conductivity of the variety of candidate TPS materials than thermocouple wire used in the prior art. Another advantage of the present invention is the flexibility of fabrication of the optical fiber with FBGs formed in a plurality of pre-determined locations. A sensor formed using this plurality of FBGs in discrete locations which forms the multiple location measurement sensor is referenced in the present patent application as a "string sensor", and single or multiple string sensors may be used to form the required set of temperature measurements. The optical fibers used herein are preferably Single Mode Fiber (SMF) with reflective Fiber Bragg Gratings (FBG). The standard coating for SMF-28 optical fiber is acrylate, which is only usable to 100° C., whereas it is preferred to use coatings such as polyimide, which is usable to 350° C. Preferably, the optical fibers are high temperature characteristic, and the optical fibers may be held in place using an adhesive with high temperature properties, such as Room Temperature Vulcanizing (RTV) Silicone. The sensor gratings also require high temperature characteristics. Traditional Type I-UV gratings are only usable to 250° C., although it has been recently discovered that if the grating is annealed, the grating is initially unusable above 350° C., but then appears again at higher temperatures in a regenerated form. An alternative grating is a type II-IR grating which is usable to 1000° C. For the highest temperatures, the sensors are preferable FBG written into sapphire fiber, which may be tapered and fused to the end of SMF-28. Since sapphire fiber is typically multi-mode, the excited mode which is coupled into SMF-28 should be only one mode so as to excite only that single mode in the sapphire fiber. A wide range of fiber may be used in the present invention, including any fiber in the range of diameters from 125 um to 400 um. It is also possible to use optical fiber as small as 80 um in the present invention.

In one embodiment of the invention, the optical fiber with a sequence of sensor gratings is formed into the TPS material during fabrication, such as the TPS material PICA. In another embodiment of the invention, the optical fiber with sensor gratings is inserted into a TPS material such as SLA after fabrication, as the SLA material has cork-like properties. The sensor insertion may be performed by first inserting the needle or first sleeve into the material followed by an insertion sleeve, then threading the sensor string with FBG measurements over the sleeve extent into the insertion sleeve, and lastly withdrawing the long sleeve which penetrates the TPS material, after which the TPS material surrounds the optical fiber sensor string. This sensor insertion method is also suitable for super-light ablator (SLA) materials.

Figure 2:
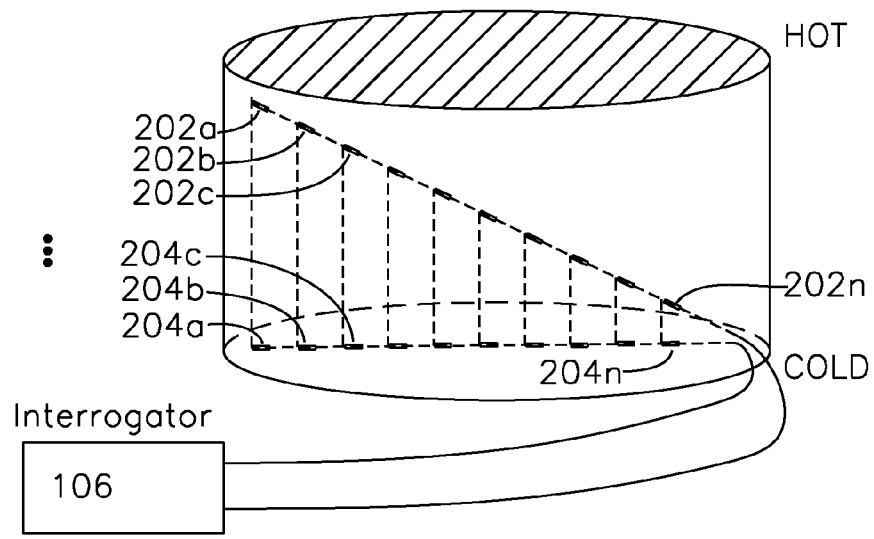
FIG. 2 is a perspective view of a test plug having two sensors in a common plane with increasing separation between adjacent sensors.

FIG. 1 shows a thermal test plug 104 having a hot surface, a relatively cooler surface, and an optical fiber 102 having a plurality of temperature sensors 102a, 102b, 102c through 102n placed parallel to the central axis of the plug 104. The individual sensors 102a, 102b, through 102n may be fiber Bragg gratings (FBG) which are responsive to an optical excitation provided by interrogator 106, with each sensor 102a, 102b through 102n responsive in a separate wavelength range, such that interrogator 106 may provide a broadband optical source to optical fiber 102, and examine the wavelength reflected by each sensor 102a, 102b, through 102n, determine a reflected wavelength within a unique range of operating wavelengths for each sensor, and thereafter convert the reflected wavelength to an associated temperature for each sensor. An example wavelength discriminator is described in U.S. Pat. No. 7,127,132 by Moslehi et al, which is incorporated by reference. In this manner, it is possible to form an axial temperature map of the plug 104. One problem that may arise is a temperature gradient across the axial extent of the FBG, thereby creating an undesirable chirped optical reflection response rather than a narrowband optical reflection response. As each sensor FBG may span 5 mm, it may be possible to reduce the sensor FBG to on the order of 0.5 mm to avoid a chirped response on the reflected wavelength from the grating. Another possible problem with a TPS plug having an axial sensor string is the compression of temperature gradient over a short extent of the TPS plug. This may be addressed by inserting the sensor string 202 at an angle to the axis, as shown in FIG. 2, and a reference sensor string 204 placed along the bottom as a reference for temperature compensation. As the wavelength shift is temperature dependant, it may be useful to provide a method to compensate the temperature effects and offsets of the TPS plug. First optical fiber 202 has gratings 202*a* through 202*n* placed at an angle with respect to the axis of the cylindrical TPS plug, and also has a second optical fiber 104 with individual gratings 204*a* through 204*n* fabricated such that each first optical fiber 202 grating has a corresponding second optical fiber 204 grating in a region of axial projection below the corresponding grating of the first fiber 202. In this manner, it is possible to measure a temperature on each of the first FBGs of first fiber 202, each of the temperatures on the FBGs of the second fiber 204, and use the acquired measurements to provide a temperature compensated measurement for each first sensor grating 202*a* through 202*n*.

The wavelength response of the gratings may also be considered, as the greatest variation in temperature occurs at the "hot" end of the TPS plug. Accordingly, to optimally use the available bandwidth of the fiber, it is preferred to arrange the sensors along the optical fiber so that the highest wavelengths are at the hottest end of the fiber in TPS use, and the lowest wavelengths are at the coldest end of the fiber in use. For example, a typical FBG has a 10 pm/° C. thermal response, which would result in a 10 nm shift at the hottest end. Accordingly, it is preferred that this shift be away from the lower wavelengths to avoid wavelength shifts which cross each other during operation.

Figure 3:
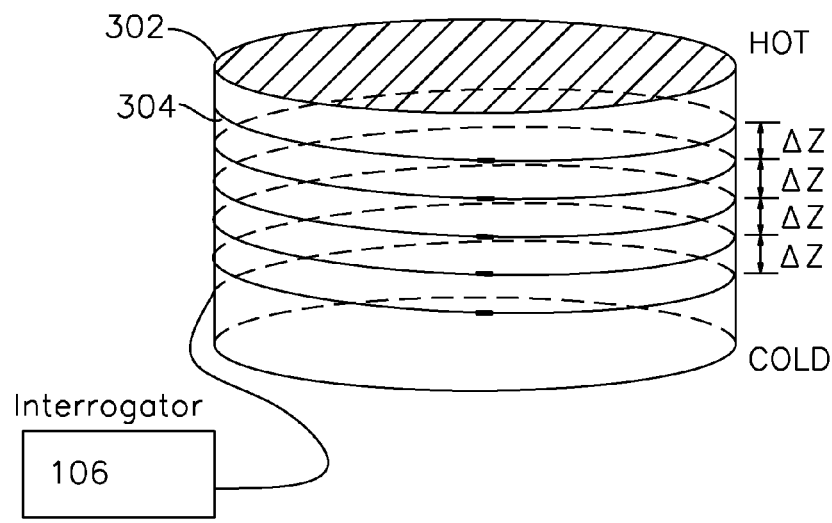
FIG. 3 is a perspective view of a test plug having a helically wound sensor string with sensors with a substantially fixed axial spacing.

FIG. 3 shows another embodiment of the invention, where the optical fiber 304 is wound around the exterior surface of a test plug 302. In the embodiment shown in FIG. 3, the individual fibers are fabricated a distance π*D from each other such that on each winding, the FBGs are present in a vertical column, as shown in FIG. 3. The optical fiber may be placed into a u-groove, with each grating aligned axially above the previous grating, and positioned ΔZ apart axially, as shown.

Figure 4:
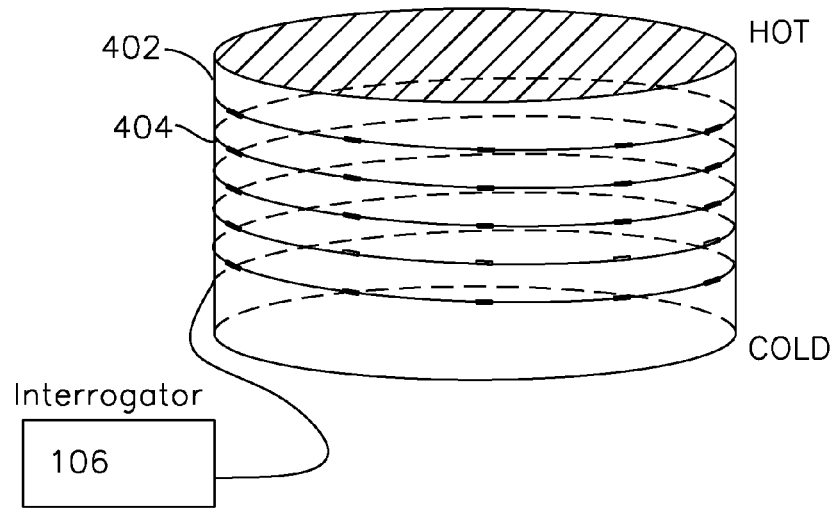
FIG. 4 is a perspective view of a test plug having a helically wound sensor string with circumferential spaced sensors.

FIG. 4 shows a perspective view of another embodiment of the invention, where the individual FBG sensors are positioned along the circumference of the cylindrical test plug, with several FBG sensors per helical turn around the TPS plug. For the case where the temperature variation is small in the transverse x-y plane compared with the vertical temperature variation, the depth resolution can be improved N times from that of FIG. 3, where N is the number of FBGs in one revolution of the helix about the TPS plug.

Figure 5:
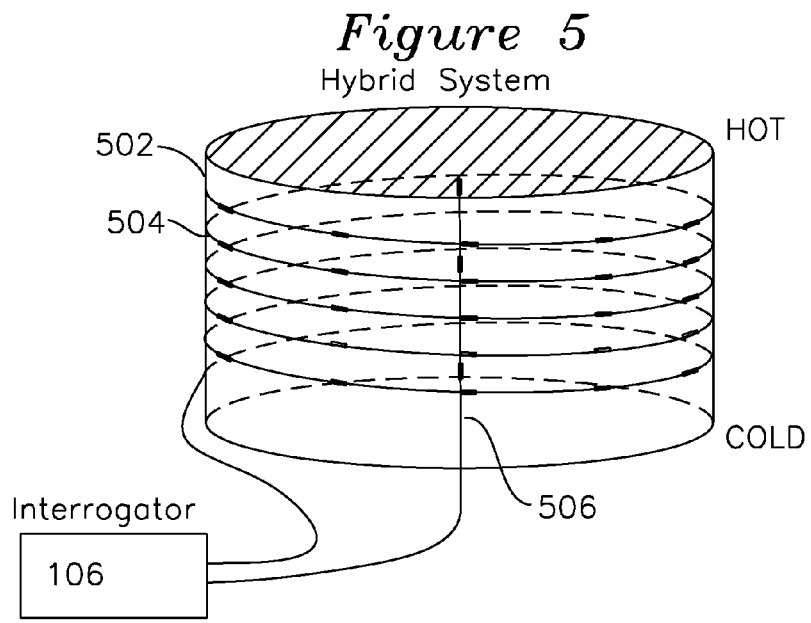
FIG. 5 is a perspective view of a test plug having a combination of helical and axial sensors.

FIG. 5 shows a hybrid measurement system, having the helically wound sensor 505 of FIG. 4 combined with an axial sensor. In this configuration, the axial sensor 506 may be a sapphire FBG, which is suitable for capturing very high temperatures exceeding 1000° C., whereas the helical temperature sensor may use conventional glass fiber, or alternatively, the end of the optical fiber where the hottest temperatures are likely to be experienced may be formed from sapphire FBGs.

Figure 6A:
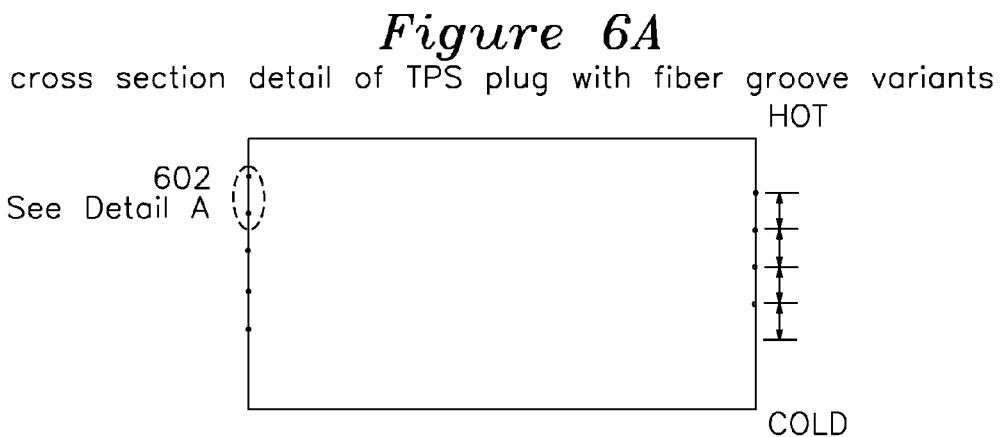
FIG. 6A shows a cross section view of a temperature measurement plug.
Figure 6B:
FIGS. 6B, 6C, and 6D are cross section details of FIG. 6A for various optical fiber placement geometries.
Figure 6C:
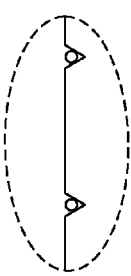
Figure 6D:
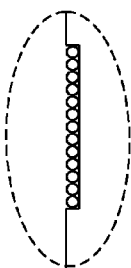

FIG. 6A shows a cross section diagram of the TPS plug with the optical fibers placed into channels 602. The channels may take several different forms, as shown in FIG. 6B for a U-shaped channel, FIG. 6C for a V shaped channel, or FIG. 6D for a slot having a closely spaced optical fiber winding. One layer of optical fiber in the winding is shown, but alternatively multiple layers of optical fiber with FBG temperature sensors may be provided. The U-groove of FIG. 6B is advantageous where no filler or high temperature bonding materials is used, and the U-groove may be formed using a cylindrical wire. The V-groove of FIG. 6C may be simpler to form into the TPS plug using a cutting tool, and may be preferable where voids surrounding the optical fiber are not an issue, or when a filler of bonding material is used. The optical fiber diameter may vary from 400 u for all-silica down to 135 u for polyimide coated 125 μm silica fiber for low temperature sensing (up to 350° C.)

Figure 7:
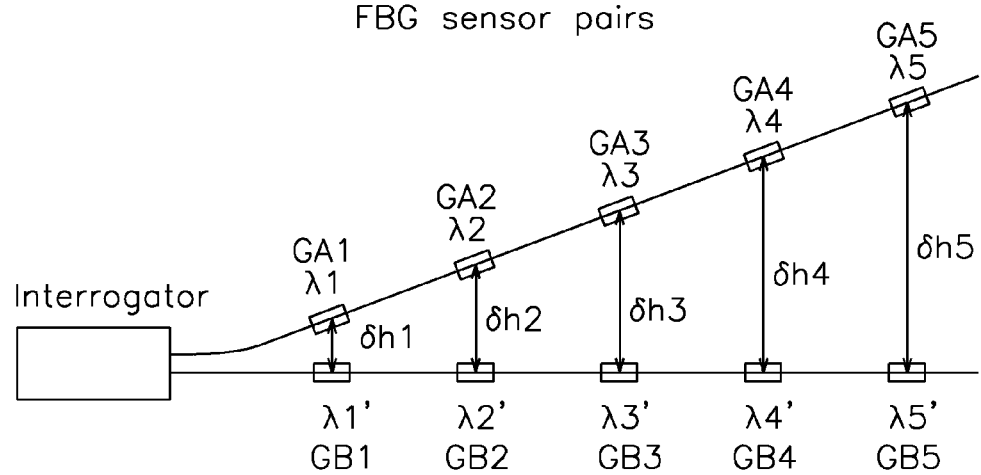
FIG. 7 shows two string sensors such as may be used in FIG. 2.

FIG. 7 shows the sensor string pair for the configuration of FIG. 2. The sensor parameters are:

FBG sensor spacing along the optical fiber (ΔL)
Incline angle of optical fiber (γ)
FBG sensor length (LB)
Sensor encapsulation method and hole size (in the TPS material)

For a single FBG sensor (not subjected to strain and not constrained by a surrounding material system), the temperature difference between the FBG sensor and ambient temperature, δT, can be calculated as:

$$\delta T = \frac{1}{(\xi + \alpha)} \frac{\delta \lambda_B}{\lambda_B} \quad (1)$$

where $\lambda_B$ is Bragg wavelength of the FBG at ambient temperature, $\delta \lambda_B$ is the shift in Bragg wavelength due to the temperature, $\xi$ is the thermo-optic coefficient of silica, and $\alpha$ is the thermal expansion coefficient of silica. In reality, the coefficient $1/(\xi+\alpha)$ is nonlinear with temperature. This coefficient can therefore be calibrated for the specific FBGs.

The heat flux, $\phi$ (in W/m²), can then be determined from the Bragg wavelength shifts of a pair of FBG sensors as $$\phi = C_T \delta h (\delta T^A - \delta T^B) \quad (2)$$

where $\delta h$ is the vertical spacing between the two sensors, $\delta T^A$ and $\delta T^B$ are the temperature shifts of the upper and lower FBG sensors respectively, as determined by Equation 1 applied to FBG A and B separately. The heat transfer coefficient CT is theoretically a function of the thermal conductivity of the TPS material. In reality, many additional factors will affect CT, and must be accounted for (either theoretically or empirically).

Figure 8A:
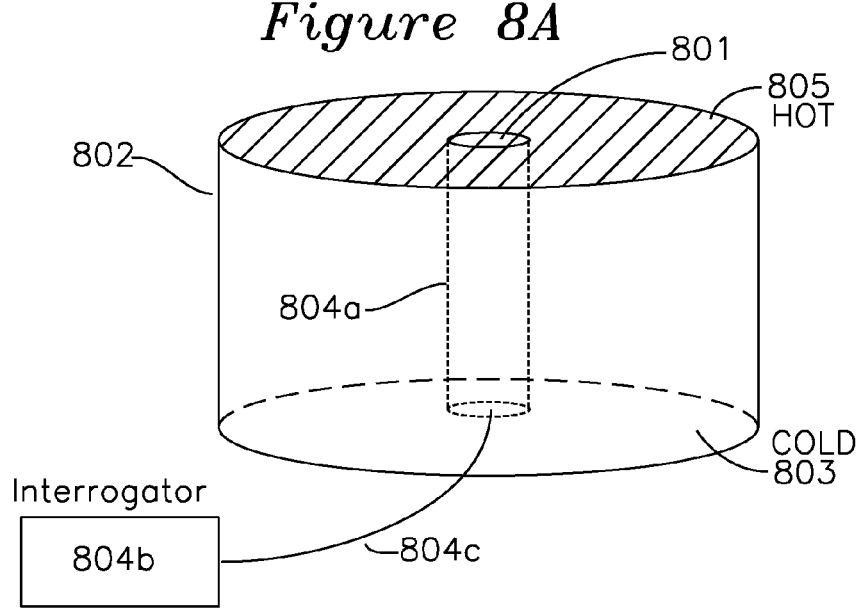
FIG. 8A shows a TPS plug inserted into a sheet of TPS material.

FIG. 8A shows a TPS plug 801 inserted into surrounding TPS shield 802, which has a "cold" (non-ablating) surface 803 and "hot" (ablating) surface 805, reference surfaces which are selected based on the thermal gradient which is expected to develop during use of the shield 802, such as during atmospheric re-entry of an extra-terrestrial vehicle. Typically, for accurate thermal characterization, the test plug 801 and surrounding shield material 802 are formed from the same TPS material for homogeneity of temperature response in the characterization or measurement process. Test plug 801 may be formed using any of the previously described sensor and plug geometries, such as was shown for FIGS. 1, 2, 3, 4, 5, or FIG. 7, and with any of the fiber groove arrangements as shown in FIG. 6A, 6B, 6C, or 6D. As the hot side of shield 802 may become hot enough to begin to destroy the proximal end of the optical fiber and associated sensors, the plug 801 is typically inserted from the cold side of shield 802, with the end of the optical fiber closest to the hot side of shield 802. In this manner, the remaining sensors of the string sensor continue to function even when the sensors closest to the "hot" (ablating) surface are destroyed by heat and ablation. In one embodiment of the invention, the test plug 801 is placed into a matching "blind" aperture which extends close to, but does not penetrate, hot surface 805, and in another embodiment of the invention, the test plug 804*a* is placed into a matching aperture which penetrates surface 805, and test plug 801 ablating end is positioned flush to surface 805, or is trimmed until it is flush to surface 805.

Figure 8B:
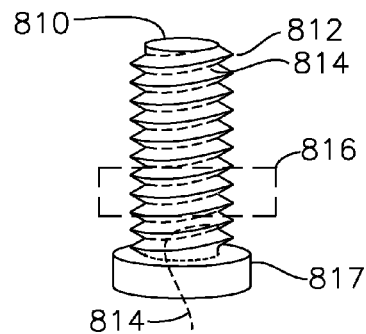
FIG. 8B shows a threaded embodiment of a TPS plug.
Figure 8C:
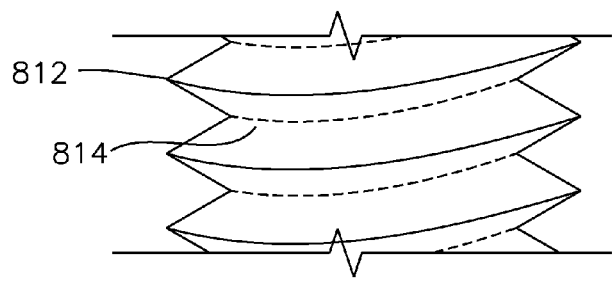
FIG. 8C shows a detail view of FIG. 8B.
Figure 8D:
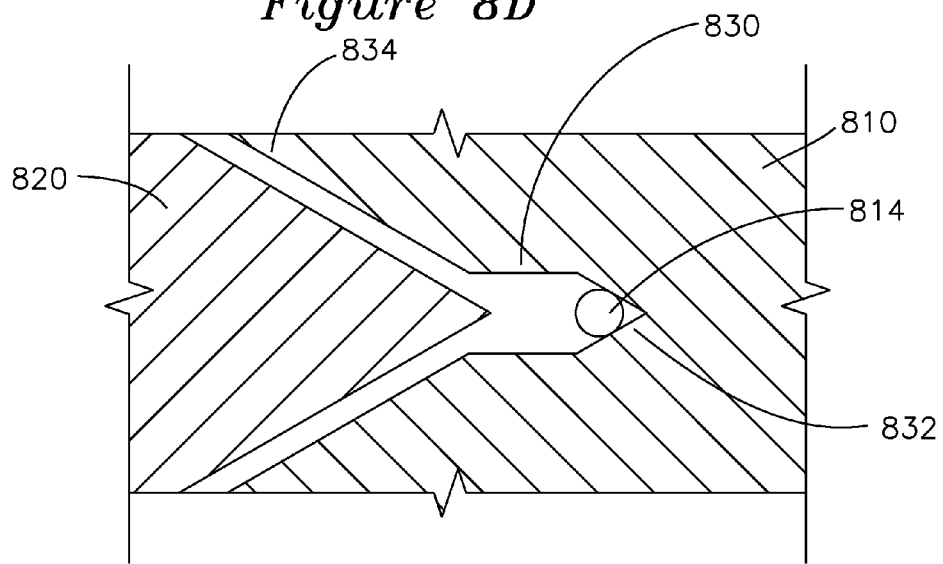
FIG. 8D shows another detail view of FIG. 8B.
Figures 1, 8D:
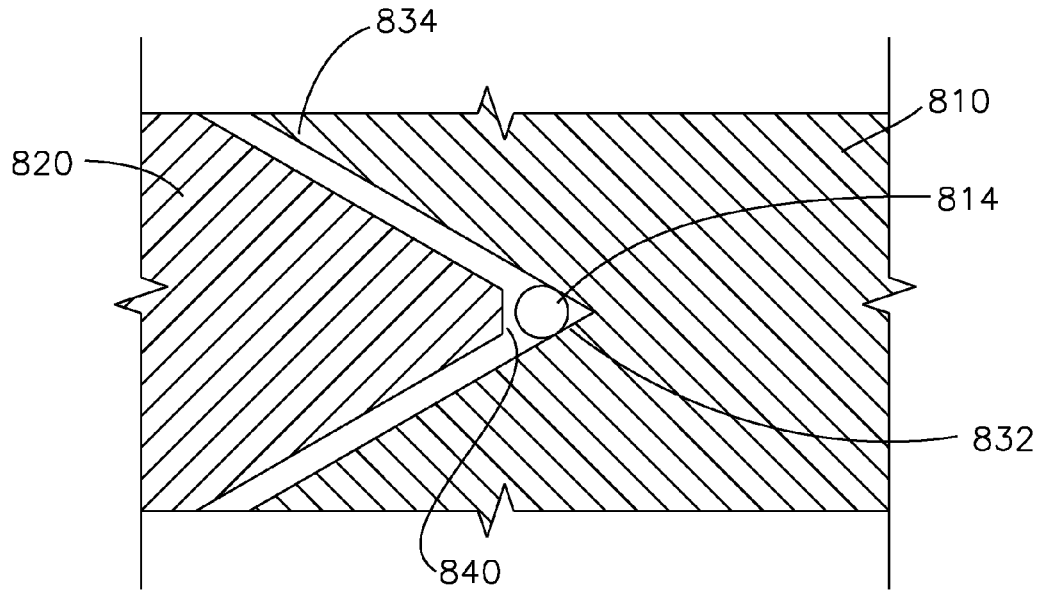

FIGS. 8A, 8B, 8C, and 8D may be viewed in combination for understanding the present embodiment example. FIG. 8B shows a threaded plug for use as test plug 801 engaging with matching threads in the plug region of shield 803. In the threaded embodiment, the shield 803 and test plug 801 have mating threaded surfaces, and threads 812 of test plug body 810 engage and secure the plug using matching threads formed in shield 802. The test plug 801 is typically threaded so that it may be inserted from the "cold" surface 803 of FIG. 8A, and advanced into shield 802 until the end of the threaded body 810 is flush with the ablation surface 805, such that the test plug 801 and shield 802 are flush at the surface 805. The sensor fiber has a plurality of helically arranged sensors (as previously described for FIG. 3, 4, or 5), and the fiber and sensors are placed into a groove which is formed into the bottom of the test plug 801 threads, as shown in detail FIG. 8C showing the region 816 of FIG. 8B, with thread outer surface 812 and fiber 814 placed in the inner thread diameter. FIG. 8D further shows a section view of the threaded test plug for a single thread pitch in a greatly magnified view (not to scale). Shield 820 is shown for reference in FIG. 8D, with the test plug 810 having thread groove 834 which terminates into a channel region 830 which is of sufficient depth to protect optical fiber 814. A fiber 814 groove 832 may be formed at the bottom of the channel region 830 of the test plug 810, with the groove 832 further having a 60 degree internal angle to support the optical fiber 814. In alternate embodiments, the groove 832 may be a U groove which surrounds the optical fiber 814, or it may be have other shapes. In one embodiment of the invention, the sensors of fiber 814 are coupled thermally, but not mechanically, to groove 832 of test plug 810 so that mechanical stresses which develop when threaded test plug 810 expands are not coupled as strain to the sensors on fiber 814, thereby providing temperature measurement. The optical fiber 814 of FIG. 8B may terminate in a connector at head 817 for convenience in insertion and removal, to protect the optical fiber 814 from damage. Test plug 810 may also have an axial optical fiber sensor as was shown in FIG. 1, in addition to the helical optical fiber sensor 814 shown in FIGS. 8B, 8C, and 8D.

FIG. 8D-1 shows an alternative embodiment of FIG. 8D where shield 820 surrounds plug 810, and the channel 830 shown in FIG. 8D is shortened so that the threads form V-groove 832 preferably at substantially 60 degrees, and the matching thread in the surrounding shield 820 is blunted thread 840 to avoid contact or damage to optical fiber 820 and associated FBG sensors.

In the previously described examples of the invention, it may be preferable to secure the optical fiber with RTV Silicone, or other high temperature adhesive having the property of coupling thermal energy to the sensor, without coupling mechanical strain to the fiber, which would undesirably effect the reflection wavelength and associated temperature measurement.

Insertion of delicate optical fiber into the test plug may require special considerations to avoid damage to the fiber, while maintaining thermal coupling to the test plug. In one process for insertion of the optical fiber, several sequential steps are performed. In a first step, a sharpened steel rod of slightly larger outer diameter than the optical fiber is inserted into the TPS test plug, following the desired path of the optical fiber, and the steel rod is subsequently removed. In a second step, a thin-walled metal tube is inserted into the path formed during the first step, with the metal tube having an inner diameter sufficient to allow the sensor optical fiber to be inserted. The optical fiber may be inserted into the tube during this step or after the tube has been inserted and the tube cleared of any debris inside the tube. In a third step, after the tube of the second step has been inserted into the TPS test plug and the optical fiber placed into the tube, the tube is withdrawn, leaving the optical sensor fiber in the path formed by the first step. An optical connector step may be performed whereby the optical fiber is secured to a connector which is secured to the TPS material, so that the test plug may be handled without damage to the optical fiber, which is now enclosed and protected by the TPS test plug.

The examples given are for understanding of the invention only, the breadth of the invention which is limited only by the claims which follow.

We claim:

1. A test plug having a substantially planar ablation end and a non-ablation end, the test plug operative to seal an aperture formed in a surrounding material having a complementary shape formed from a similar material as said test plug, said test plug comprising:
   an engagement surface located about an axis which is perpendicular to said substantially planar ablation end;
   an optical fiber having, in sequence, a measurement end for introduction of broadband optical energy, a first sensor, a plurality of sequential sensors, and a final sensor, each said sensor reflecting a particular wavelength of broadband optical energy applied to said measurement end, said first sensor positioned closest to said non-ablation end of said test plug and said final sensor positioned closest to said ablation end;
   said optical fiber helically positioned about said engagement surface;
   a broadband optical source coupling optical energy into said optical fiber measurement end; and
   a wavelength discriminator coupling optical energy out of said optical fiber measurement end and resolving optical energy reflected by a particular sensor into a temperature.

2. The measurement system of claim 1, where said sensors are fiber Bragg gratings.

3. The measurement system of claim 1, where an optical fiber is positioned parallel to an axis of said test plug.

4. The measurement system of claim 1, where said optical fiber is helically wound about an axis of said test plug.

5. The measurement system of claim 1, where said test plug engagement surface includes threads.

6. The measurement system of claim 1, where said test plug engagement surface includes threads, and said optical fiber is positioned in a groove formed by said threads.

7. The measurement system of claim 1, where said optical fiber is either a sapphire optical fiber or a glass optical fiber.

8. The measurement system of claim 1, where said optical fiber is secured to said test plug using an adhesive.

9. The test plug of claim 1, where said optical fiber is positioned substantially co-axial to the central axis of the test plug.

10. The test plug of claim 1, where said optical fiber comprises a plurality of optical fibers positioned in different locations in said test plug.

11. The test plug of claim 1, where said optical fiber is formed from at least one of Sapphire and/or Silica.

12. The test plug of claim 1 where said test plug is formed from at least one of Phenolic Impregnated Carbon Ablator (PICA) or Silicone Impregnated Reusable Ceramic Ablator (SIRCA) or a Superlight Ablator (SLA).

13. The measurement system of claim 1, where said helically positioned optical fiber is positioned in a helical groove forming threads.

14. The measurement system of claim 13, where said optical fiber is positioned in the bottom of said helical groove forming said threads.

15. The measurement system of claim 1, where said test plug engagement surface includes threads, said threads having an engagement part and a channel slot part for separation of a groove from said thread engagement part, said optical fiber supported in said groove.

16. The measurement system of claim 15, where said groove is either V shaped or U shaped.

17. The measurement system of claim 16, where said groove is V shaped and forms a 60 degree angle in the surfaces adjacent to said optical fiber.

18. A temperature measurement apparatus comprising:
- a thermal protection system (TPS) plug formed from a material selected from the same material as a surrounding material having a complementary shape as said plug;
- said plug having a temperature sensor positioned about an outer surface which is in contact with a surface of said aperture;
- said plug having a central axis, said plug also having first surface for exposure to high temperature, and an opposing second surface, said first surface being substantially perpendicular to said central axis; and
- said temperature sensor comprising an optical fiber having a plurality of fiber Bragg gratings (FBG), each said FBG positioned with its fiber axis approximately parallel to said first surface, said optical fiber wound helically about said central axis and on said plug surface which is in contact with a surface of said aperture.

19. The temperature measurement apparatus of claim 18, where said plurality of FBG include at least two FBG which are positioned on a line which is perpendicular to said first surface.

20. The temperature measurement apparatus of claim 18, where said plug has smooth sidewalls and said FBGs are positioned on said smooth sidewalls.

* * * * *